United States Patent
Muto (10) Patent No.: US 7,688,385 B2
(45) Date of Patent: Mar. 30, 2010

(54) VIDEO SIGNAL PROCESSING APPARATUS AND METHOD

(75) Inventor: Yasuhiko Muto, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/338,800

(22) Filed: Dec. 18, 2008

(65) Prior Publication Data

US 2009/0219438 A1   Sep. 3, 2009

(30) Foreign Application Priority Data

Feb. 29, 2008   (JP) .............................. 2008-051188

(51) Int. Cl.
*H04N 7/01* (2006.01)
*H04N 5/21* (2006.01)

(52) U.S. Cl. ...................... 348/441; 348/448; 348/607

(58) Field of Classification Search ................ 348/441, 348/448, 451, 452, 458, 459, 607, 672; *H04N 7/01, H04N 11/20, 5/21*
See application file for complete search history.

(56) References Cited

U.S. PATENT DOCUMENTS

| 7,106,350 | B2 | 9/2006 | Baba et al. | |
|---|---|---|---|---|
| 7,113,222 | B2 * | 9/2006 | Kodama | ..................... 348/452 |
| 7,425,990 | B2 * | 9/2008 | Hoshino et al. | ............. 348/441 |
| 2005/0134735 | A1 | 6/2005 | Swartz | |
| 2007/0058712 | A1 | 3/2007 | Kamaguchi | |

FOREIGN PATENT DOCUMENTS

| JP | 2000-244877 | 9/2000 |
|---|---|---|
| JP | 2004/023670 | 1/2004 |
| JP | 2004-023670 | 1/2004 |
| JP | 2005-167887 | 6/2005 |
| JP | 2005-208613 | 8/2005 |
| JP | 3903703 | 4/2007 |
| WO | 2004/112378 A1 | 12/2004 |

* cited by examiner

*Primary Examiner*—Sherrie Hsia
(74) *Attorney, Agent, or Firm*—Blakely Sokoloff Taylor & Zafman, LLP (57) ABSTRACT

According to one embodiment, an embodiment of the invention is applicable to various input video signals, prevents image quality degradation in a signal conversion process, and maintains image quality. A front stage unit has a first video signal processing circuit, which reduces noise and performs IP conversion in response to a first image processing control signal from a first control circuit. A rear stage unit has a second video signal processing circuit, which executes frame rate conversion in response to a second image processing control signal from a second control circuit. An arithmetic circuit functions so that the contents of the first image processing control signal exerts an influence upon the second image processing control signal.

8 Claims, 10 Drawing Sheets

VIDEO SIGNAL PROCESSING APPARATUS AND METHOD

CROSS-REFERENCE TO RELATED APPLICATIONS

This application is based upon and claims the benefit of priority from Japanese Patent Application No. 2008-051188, filed Feb. 29, 2008, the entire contents of which are incorporated herein by reference.

BACKGROUND

1. Field

One embodiment of the invention relates to a video signal processing apparatus and method, which are preferably used for a television receiver, a video signal recording/reproducing apparatus, and a set top box.

2. Description of the Related Art

A variety of types of video signals have been used for a television receiver in recent years. For example, an interlace video signal, and a film signal that is electrically converted from an interlace video signal and a film image. Various aspect ratios are also available. Accordingly, a video signal processing apparatus is required to have an IP conversion function to convert an interlace signal to a progressive (non-interlace) video signal. A view angle conversion function is also required to change the aspect ratio of an image displayed on a screen to 4:3 or 16:9, or to change the display mode to zoom, wide or super-live, etc. An image quality adjustment function is also required. Further, as a display size is increased, a frame rate conversion function is required to convert scanning lines at double speed for example.

To satisfy the above requirements, movement of an image is detected by an image movement detection circuit, and an interpolation signal is generated by an interpolation circuit according to the detected image movement. There is an apparatus which reduces noise by using information about the image movement detected by an image movement detection circuit (e.g., Patent Document 1: U.S. patent application Ser. No. 2007/0058712A1 (International Publication No. W02004/112378)).

The film signal described above is also called a 2-3pull-down signal or a 2-2pull-down signal. As an interlace signal or a progressive signal exists in such a film signal, the above-mentioned IP conversion function, view angle conversion function, image quality adjustment function and frame rate conversion function are required. IP conversion of a film signal is different from IP conversion of a video signal of an ordinary television standard. The technique for IP conversion of a film signal is disclosed in Patent Document 2 (U.S. patent application Ser. No. 2005/0134735A1 (Japanese Patent Application No. 2005-208613)).

As described above, various types of input video signal have been used, and a video signal processing apparatus requires an IP conversion function, a view angle conversion function, an image quality adjustment function and a frame rate conversion function. In the prior art, a video signal processing apparatus is improved individually for each requirement disclosed in the above Patent Documents.

In the prior art, there is no video signal processing apparatus applicable to all types of input video signal. There is also no video signal processing apparatus operable stably for various types of input video signal. Namely, in the prior art, there is no technique for integrally combining an IP conversion function, a view angle conversion function, an image quality adjustment function, and a frame rate conversion function that does not involve problems.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings.

According to one embodiment related to the present invention to provide a video signal processing apparatus and method which is applicable to various types of input video signal, prevents degradation of video quality in a signal conversion process, and maintains image quality and definition.

According to one aspect of the embodiment, there is provided an apparatus comprising a front stage unit for processing a first video signal; and a rear stage unit for processing a progressive signal output from the front stage unit, wherein the front stage unit has a first control circuit which determines the image characteristic of the first video signal, and outputs a first image processing control signal determining which of dynamic image adaptive processing and static image adaptive processing is to be performed for the first video signal, and a first video signal processing circuit which provides a progressive signal that is formed by performing the dynamic image adaptive processing or static image adaptive processing for the first video signal in response to the first image processing control signal, and the rear stage unit has a second control circuit which determines the image characteristic of the progressive signal as information to generate an interpolation frame signal for doubling the frame frequency of the progressive signal from the first video signal processing circuit, and outputs a second image processing control signal determining which of dynamic image adaptive processing and static image adaptive processing is to be performed for the progressive signal, and a second video signal processing circuit which provides the interpolation frame signal that is formed by performing the dynamic image adaptive processing or static image adaptive processing for the progressive signal in response to the second image processing control signal, and provides a frame rate conversion output signal by using the interpolation frame signal and progressive signal.

An arithmetic circuit is connected between the front stage unit and rear stage unit. The arithmetic circuit provides a transmission control signal, which controls the second image processing control signal not to shift to an output state of dynamic image adaptive processing, and corrects to shift to an output state of static image adaptive processing, when the first image processing control signal indicates static image adaptive processing, and releases the control when the first image processing signal indicates dynamic image adaptive processing.

By the above means, even if a mismatch occurs in the determination results of a scanning line number conversion unit in the front stage and a dynamic image improvement and frame rate conversion unit in the rear stage, dynamic image adaptive processing and static image adaptive processing of the dynamic image improvement and frame rate conversion unit follows the determination result of the scanning line number conversion unit, and a failure is unlikely to occur in an output video signal from the dynamic image improvement and frame rate conversion unit.

Figure 1:
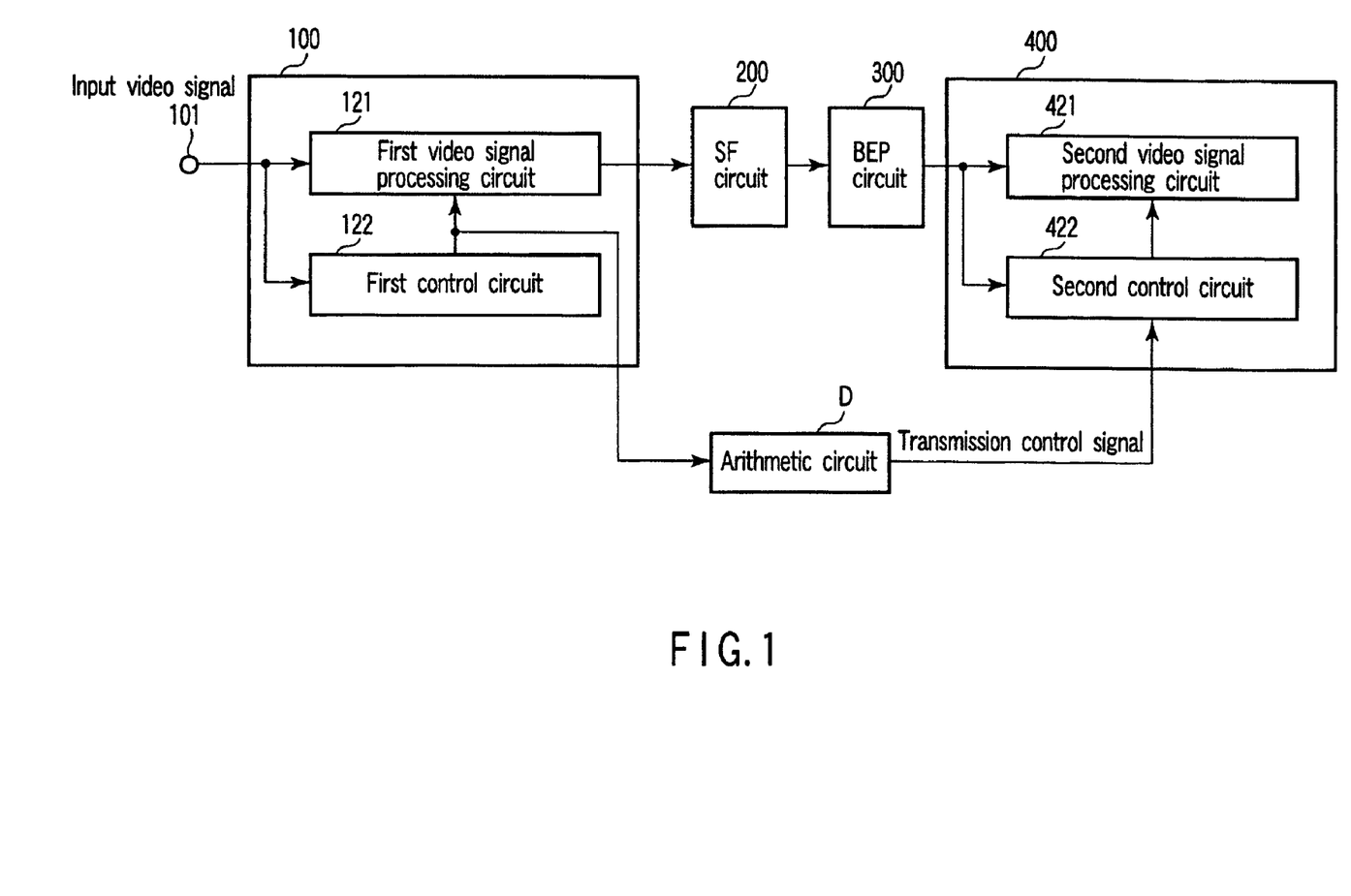
FIG. 1 is a block diagram showing a basic configuration of the invention.

First, an explanation will be given on the basic configuration of a video signal processing apparatus and method according to an embodiment of the invention with reference to FIG. 1.

<Noise Reduction and Scanning Line Number Conversion Unit 100 as a Front Stage>

A digital input video signal is input to an input terminal 101. The input video signal is sent to a first video signal processing circuit 121, in which noise in the input video signal is reduced and the number of scanning line of the video signal is converted. The input video signal is then sent to a first control circuit 122. The first control circuit 122 determines the image characteristic of the input video signal. Namely, whether the input video signal is a dynamic image or static image is determined. The first control circuit 122 outputs a first image processing control signal indicating a dynamic image or a static image. The first image processing control signal is supplied to a control terminal of the first-video signal processing circuit 121. The first image processing control signal determines which of a signal in a field (frame) or a signal between fields (frames) of the input video signal is to be preferentially used.

The first video signal processing circuit 121 synthesizes a signal in a field (frame) or a signal between fields (frames) of the input video signal, in response to the first image processing control signal.

<Dynamic Image Improvement and Frame Rate Conversion Unit 400 as a Rear Stage>

A dynamic image improvement and frame rate conversion unit 400 as a rear stage has a second video signal processing circuit 421 which doubles the frame frequency of a second video signal processed by the first video signal processing circuit 121. The second video signal is also input to a second control circuit 422.

The second control circuit 422 determines the image characteristic of the second video signal as information for generating an interpolation frame signal. Namely, the second control circuit determines whether the second video signal is a dynamic image, a static image, or a film signal, when an interpolation frame signal is generated. The second video signal processing circuit 421 executes frame rate conversion of the second video signal, based on the second image processing control signal indicating the determination result. The video signal converted the frame rate is supplied to a display 500.

<Arithmetic Circuit D>

An arithmetic circuit D is connected between the front stage unit 100 and rear stage unit 400. The arithmetic circuit D generates a transmission control signal according to the contents of the first image processing control signal, and outputs the transmission control signal to the second control circuit 422. The second control circuit 422 forcibly controls the output of the arithmetic circuit D, or a second image processing control signal, in response to the transmission control signal.

Namely, when the first image processing control signal indicates preferential use of a static image adaptive processing signal, the arithmetic circuit D controls the second image processing control signal not to shift to a state indicating the preferential use of the dynamic image adaptive processing signal, and makes correction to shift to a state indicating the preferential use of the static image adaptive processing signal. When the first image processing control signal indicates preferential use of a dynamic image adaptive processing signal, the arithmetic circuit D outputs a transmission control signal to release the control.

<Basic Effects>

As an image processing control signal determined in a front stage unit is referred to in the dynamic image improvement and frame rate conversion unit as a rear stage unit as described above, a failure is unlikely to occur in an output video signal from the dynamic image improvement and frame rate conversion unit. When the front and rear stage units individually determine the image characteristic, a mismatch may occur in the determination results, and a failure may occur in a video signal output from the dynamic image improvement and frame rate conversion unit, as an output stage. This problem is solved in the embodiment described above.

In the embodiment described above, the noise reduction and scanning line number conversion unit 100 is indicated as a front stage unit. But, the configuration is not limited to this. A movement detection signal that is detected in a brightness/color separation unit may be applied to the arithmetic circuit D.

<More Concrete Circuit Configuration>

Figure 2:
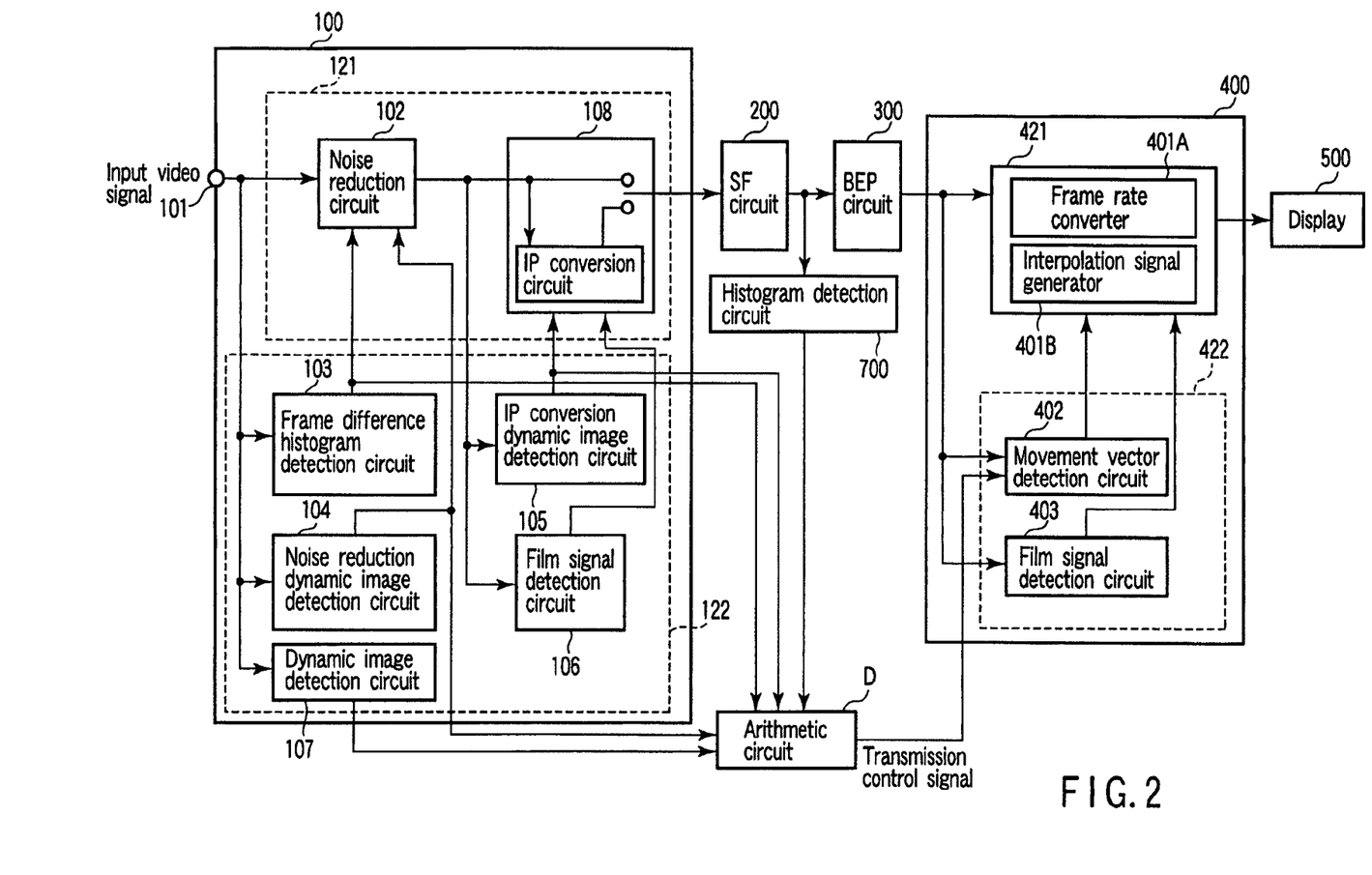
FIG. 2 is a block diagram showing the configuration of FIG. 1 more concretely.

FIG. 2 shows an example of a more concrete circuit configuration. An input video signal is input to a noise reduction circuit 102. The input video signal is also input to a frame difference histogram detection circuit 103 and a noise reduction dynamic image detection circuit 104, which compose the first control circuit 122. The output of the noise reduction circuit 102 is input to an IP conversion dynamic image detection circuit 105, and a film signal detection circuit 106.

In the noise reduction circuit 102, as noise reduction filters, a core ring filter and a cyclic filter are arranged in parallel and supplied with a common input signal, and the outputs of these filters are added. When an input video signal is a static image, the filtering effect of the cyclic filter is increased and the filtering effect of the core ring filter is decreased, by a movement detection signal from the noise reduction dynamic image detection circuit 104. In contrast, when an input video signal is a dynamic image, the filtering effect of the core ring filter is increased.

The frame difference histogram detection circuit 103 obtains a histogram from a difference signal between frames (fields). The difference histogram signal is set to enhance the filtering effect of the core ring filter when an input video signal is a dynamic image, and to act effectively to reduce a block noise remaining when MPEG2 is demodulated, for example. The output of the noise reduction dynamic image detection circuit 104 is effective in reducing a random noise.

A noise-reduced video signal is applied to the scanning line number conversion circuit 108, in which the number of scanning lines is converted. In this case, when the input video signal is originally a non-interlace video signal, the input video signal is merely passed through the scanning line number conversion circuit 108.

When the input video signal is an interlace video signal, the number of scanning lines is converted depending on the movement. The IP conversion dynamic image detection circuit 105 determines whether the input video signal is a dynamic image or a static image, and controls the operation of the scanning line number conversion circuit 108 based on the determination result.

<Dynamic Image>

When a video signal input to the scanning line number conversion circuit 108 is a dynamic image, an interpolation scanning line is created by using a scanning line in a field, for example. A frame signal is created as a progressive video signal by combining the interpolation scanning line and original scanning line. As a result, a progressive video signal with a frame frequency of 60 Hz can be obtained.

If a frame frequency of an input video signal is 30 Hz, an interpolation frame signal between frames is further created by using previous and next frame signals. A progressive video signal with a frame frequency of 60 Hz is created by arraying the interpolation frame signal and original frame signal.

<Static Image>

When a video signal input to the scanning line number conversion circuit 108 is a static image, an interpolation scanning line is created by using a scanning line between fields. A frame signal is created as a progressive video signal by combining the interpolation scanning line and original scanning line. As a result, a progressive video signal with a frame frequency of 60 Hz can be obtained.

If a frame frequency of an input video signal is 30 Hz, an interpolation frame signal between frames is further created by using previous and next frame signals. A progressive video signal with a frame frequency of 60 Hz is created by arraying the interpolation frame signal and original frame signal.

<Film Signal>

A video signal applied to the input terminal 101 may be a film signal that is 2-3or 2-2pulled down from a film image. Detection of the film signal is determined by the film signal detection circuit 106 as follows. The determination result can be considered as a certain pattern, such as 0001100011 . . . . The signal used for the determination is also called a film information signal.

When an input video signal is a frame signal, the number of scanning lines is converted faithfully to an original 24-frame film image, if the number of scanning lines is converted. Namely, an interpolation line for three fields corresponding to the pattern "000" uses any one of the signals in these three fields. An interpolation line for two fields corresponding to the pattern "11" uses any one of the signals in the two fields. They are also called inverse 2-3pull-down and inverse 2-2pull-down processing.

<Dynamic Image Detection Circuit 107>

A dynamic image detection circuit 107 determines whether an input video signal is a dynamic image or a static image. The output of the dynamic image detection circuit 107 may be a 2-value signal to determine a dynamic image and a static image. The output of the dynamic image detection circuit 107 may be a multi-value signal to obtain a maximum value of 1111 to determine a dynamic image or a minimum value of 0000 to determine a static image, for example. The dynamic image detection circuit 107 may also be a circuit to provide an intermediate value between the maximum and minimum values to judge a dynamic image and a static image. The output of the dynamic image detection circuit 107 is used by an arithmetic circuit D to be explained later.

<Scale Filter (SF) Circuit 200>

An output video signal of the scanning line number conversion circuit 108 is input to a scale filter circuit 200 as a second video signal. The scale filter circuit 200 is a circuit to convert the scale of a video signal according to an operation signal or a default signal. By the scale conversion, a video signal with an aspect ration of 4:3 can be output by converting it to 16:9, or can be output without changing the aspect ratio. A video signal with an aspect ration of 16:9 can be output by converting it to 4:3, or can be output without changing the aspect ratio. Further, the view angle of an input video signal can be changed to a zoom screen type, a wide screen type, or a panorama screen type. The conversion can be realized by a memory and memory writing/reading control, and pixel interpolation and pixel number reduction.

<Back End Process (BEP) Circuit>

The output video signal of the above SF circuit 200 is input to a BEP circuit 300. The BEP circuit 300 adjusts image quality. The image quality includes white balance and sharpness. Further, image edge shading, dithering for multi-gradation, and magical positioning may be performed as image quality adjustments. These processes are effective to enrich the gradation when a liquid crystal display is used.

<Dynamic Image Improvement and Frame Rate Conversion Unit 400>

The output of the above BEP circuit 300 is input to a dynamic image improvement and frame rate conversion unit 400. The dynamic image improvement and frame rate conversion unit 400 has a frame rate conversion circuit 401A for frame rate conversion, and a dynamic image improvement circuit 401B. The second control circuit 422 generates a control signal for the frame rate conversion circuit 401A, by using at least the output video signal from the BEP circuit 300.

The second control circuit 422 has a movement vector detection circuit 402. The movement vector detection circuit 402 detects an image movement vector from a video signal, and outputs the movement vector signal to the frame rate conversion circuit 401A as a control signal. The frame rate conversion circuit 401A converts a video signal with a frame frequency of 60 Hz to a video signal with a frame frequency of 120 Hz. At this time, an interpolation frame (also called an intermediate frame) is generated according to the movement vector size. At the same time, an interpolation scanning line is created for the interpolation frame. At this time, when the movement vector size is large and the video signal is determined to be a dynamic image, a dynamic image adaptive processing signal is used. In contrast, when the movement vector size is small and the video signal is determined to be a static image, a static image adaptive processing signal is used.

The movement vector output of the movement vector detection circuit 402 is controlled by the output of the arithmetic circuit D.

The second control circuit 422 has a film signal detection circuit 403. The film signal detection circuit 403 detects a film signal from its frame conversion pattern, and outputs a film signal detection signal.

The dynamic image improvement circuit 401B generates a video signal canceling film judder according to the film detection signal. Or, the dynamic image improvement circuit 401B converts a video signal to be applicable to 24 frames per one second.

<Film Judder Cancellation>

Cancellation of film judder means modification of an image so that a moving image is smoothly moved when a frame is changed. For example, a 2-3pull-down film signal itself has a frame change pattern of 000110001100011 . . . . Therefore, when the frame change pattern is changed from 0 to 1, and vice versa, a sudden unnatural movement occurs in a dynamic image. To reduce such unnatural movement, a moving image is modified to smoothly move with the change of a frame. For this purpose, an image movement vector is obtained when an image is changed, and the movement vector is divided and assigned to preceding frames, to which an image is not moved. Then, movement of a dynamic image is gradually modified for each frame, until the frame change pattern is changed from 0 to 1, and vice versa.

<Conversion of a Video Signal to be Applicable to 24 Frames Per One Second>

As a video signal mentioned here has 120 frames/sec, a film signal having 24 frames per one second becomes a video signal having 120 frames/sec, when the number of frames per second is used by five times. As a result, an obtained video signal is closer to a film image than a 2-3pull-down signal. The effect is particularly remarkable in a dynamic image.

<Display 500>

A display 500 may be a liquid crystal display, a self-lighting plasma display, or a field emission display.

<Arithmetic Circuit D>

An arithmetic circuit D transmits information in a front stage to a rear stage, and prevents great deterioration of image quality even if a mismatch occurs in the determination results by the front and rear stages.

The arithmetic circuit D transmits information in a front stage to a rear stage in such an apparatus, in which similar judgment (whether a dynamic image or a film signal) is performed basically in front and rear stages (the noise reduction and scanning line number conversion unit 100, and the dynamic image improvement and frame rate conversion unit 400).

Figure 3:
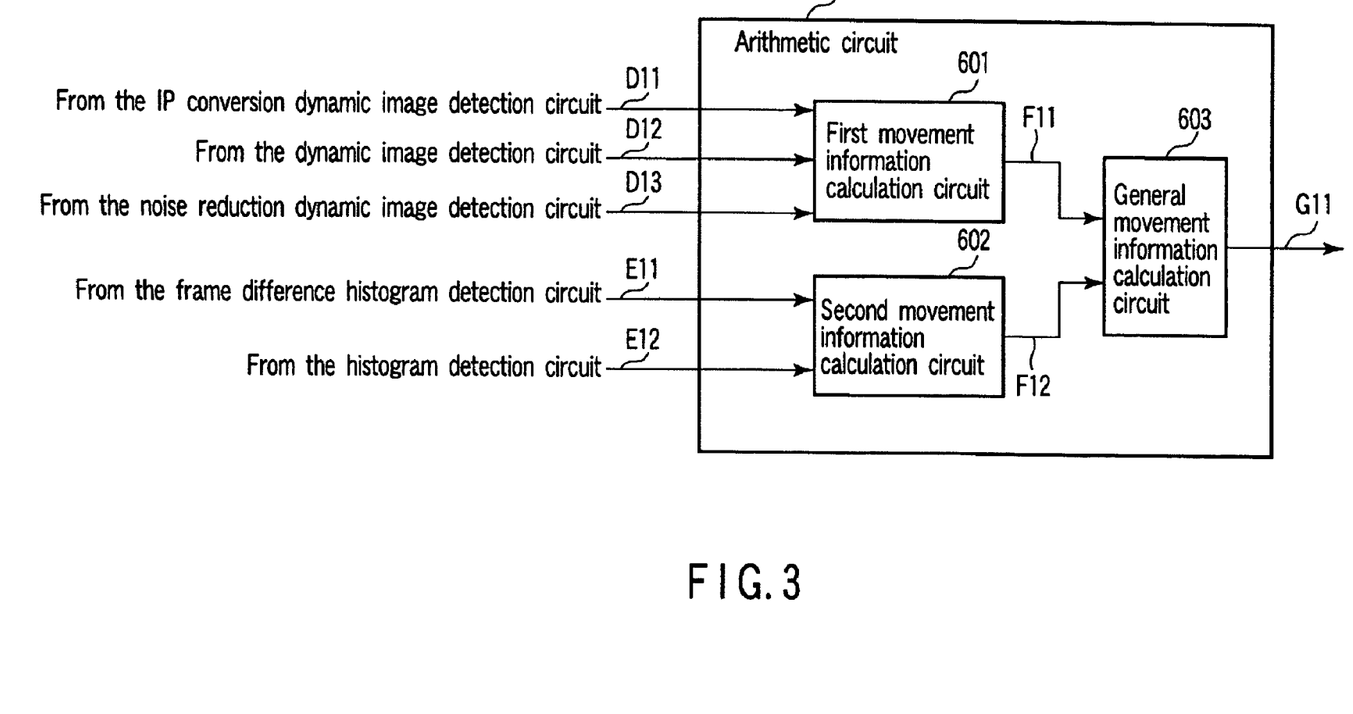
FIG. 3 shows an exemplary configuration of an arithmetic circuit shown in FIG. 2.

The arithmetic circuit D controls the output of the second control circuit 422, by using at least the output of the dynamic image detection circuit 107. As shown in FIGS. 2 and 3, the arithmetic circuit D may use a detection signal from the noise reduction dynamic image detection circuit 104, a difference histogram signal from the frame histogram detection circuit 103, a detection signal from the IP conversion dynamic image detection circuit 105, and a histogram signal from a histogram detection circuit 700. The histogram detection circuit 700 detects a histogram in the frame of the output video signal of the SF circuit 200.

Example of the Arithmetic Circuit D

FIG. 3 shows an exemplary configuration of the arithmetic circuit D. The arithmetic circuit D has a first movement information calculation circuit 601, and a second movement information calculation circuit 602. The first movement information calculation circuit 601 receives a movement detection signal D11 from the IP conversion movement detection circuit 105, a movement detection signal D12 from the dynamic image detection circuit 107, and a movement detection signal D13 from the noise reduction dynamic image detection circuit 104. The second movement information calculation circuit 602 receives a difference histogram signal E11 from the frame difference histogram detection circuit, and a histogram signal E12 from the histogram detection circuit 700.

The movement detection signals D11, D12 and D13 are assumed to be binary signals with a value of 0 or 2, or a value with a level corresponding to the degree of image movement. The first movement information arithmetic circuit 601 outputs AND or OR of the signal values, or select one of the signal values. When the image movement detection signals D11, D12 and D13 have a value with a level corresponding to the degree of image movement, the first movement information arithmetic circuit 601 adds the image movement detection signals by giving a weight, averages the image movement detection signals, or selects one of the signal values.

The second movement information arithmetic circuit 602 outputs AND or OR of the histogram signals E11 and E12, or selects one of the signal values. When the histogram signals E11 and E12 are values with a level, the second movement information arithmetic circuit 602 adds the image movement detection signals by giving a weight, averages the image movement detection signals, or selects one of the signal values.

The outputs F11 and F12 of the first and second movement information calculation circuits 601 and 602 are input to a general movement information calculation circuit 603. The general movement information calculation circuit 603 outputs a final movement detection information G11 by using the outputs F11 and F12 of the first and second movement information calculation circuits 601 and 602. When the outputs F11 and F12 have two values, the arithmetic circuit 603 outputs AND or OR of the signal values, or selects one of the signal values. When the outputs F11 and F12 have a level, the arithmetic circuit 603 adds the image movement detection signals by giving a weight, averages the image movement detection signals, or selects one of the output values.

The output G11 of the calculation circuit 603 is input to a controller of the movement vector detection circuit 402.

The output G11 determining a dynamic image or a static image is assumed to indicate a static image or to have contents indicating a static image. At this time, the movement vector detection circuit 402 is controlled by the output G11, so that the output of the movement vector detection circuit 402 easily becomes an output to determine a static image. For example, even if the output of the movement vector detection circuit 402 determines a dynamic image, this output is restricted. And, the dynamic image determination output is decreased by −1 level at every predetermined cycle, and finally becomes "0", that is, a static image determination output.

The output G11 of the calculation circuit 603 is assumed to have contents indicating a dynamic image. At this time, the restriction of the output of the movement vector detection circuit 402 is released. For example, the output is set to immediately determine a dynamic image. Or, the output may be gradually changed (shifted) to a dynamic image determination output.

As described above, in this apparatus, when the output G11 of the calculation circuit 603 indicates a static image, the movement vector detection circuit 402 is controlled by the output G11, so that the output of the movement vector detection circuit 402 easily becomes an output to determine a static image.

The reason is as follows. In the dynamic image improvement and frame rate conversion unit 400, a static image video signal originally tends to be misjudged to be a dynamic image. The misjudgment is caused by the artificial multi-gradation made by dithering and magical positioning in the BEP circuit 300.

Figure 4:
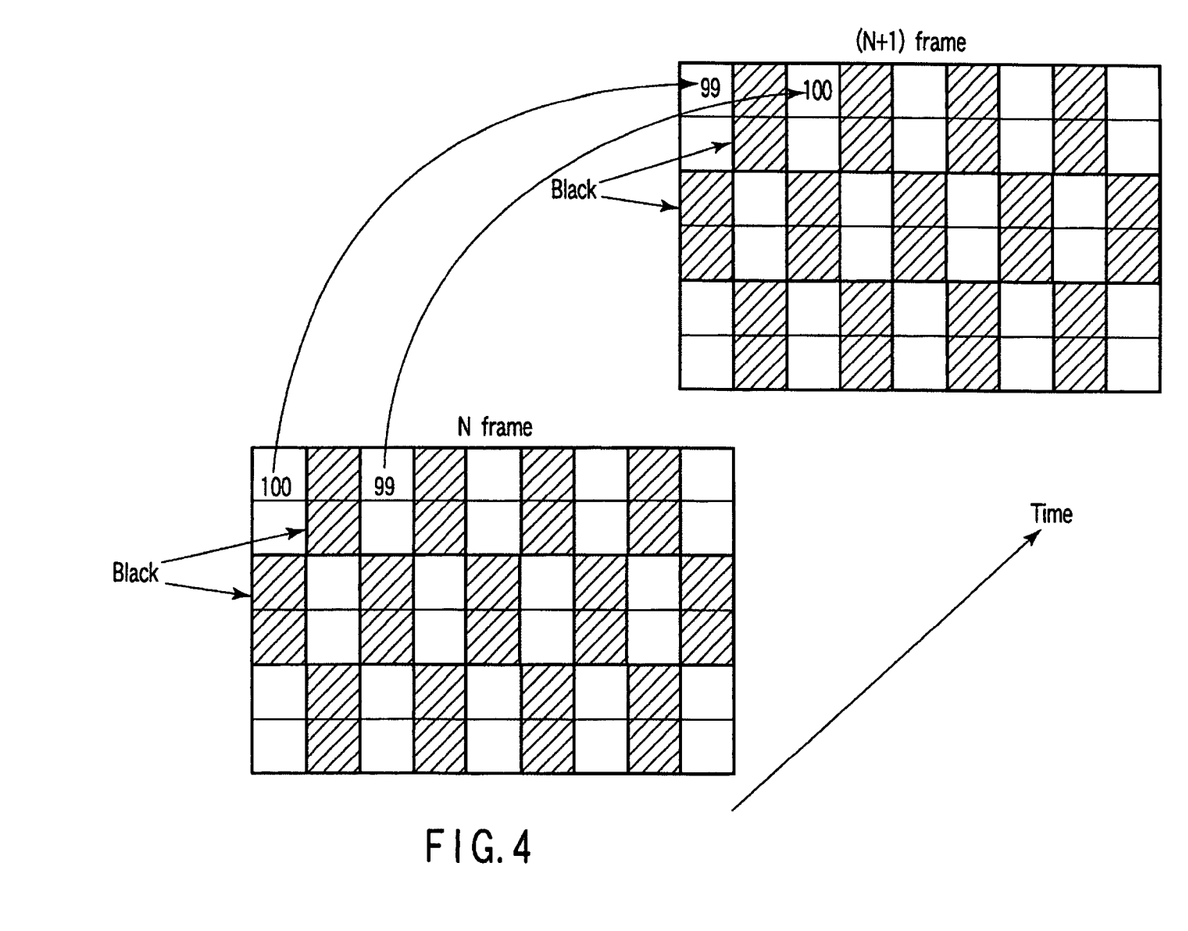
FIG. 4 is a diagram showing an example of a problem occurring in detection of movement by a dynamic image improvement and frame rate conversion unit.

For example, a static image with a checkered pattern having black and gray parts is assumed as shown in FIG. 4. When such a video signal is displayed on the display 500, error diffusing or dithering are performed. In this case, in the previous and next frames, the values of pixels or areas at the same position in the X-axis and Y-axis directions are not necessarily the same. In such a case, the movement vector detection circuit 402 detects a movement vector as if an image is moved, though the image is a static image. This is a misjudgment. Therefore, in the apparatus according to the invention, when the output G11 determining a dynamic image or a static image indicates a static image, the output of the movement vector detection circuit 402 is restricted and controlled to determine a static image, as described above.

<Restriction and Release of the Output of the Movement Vector Detection Circuit 402>

Figure 5:
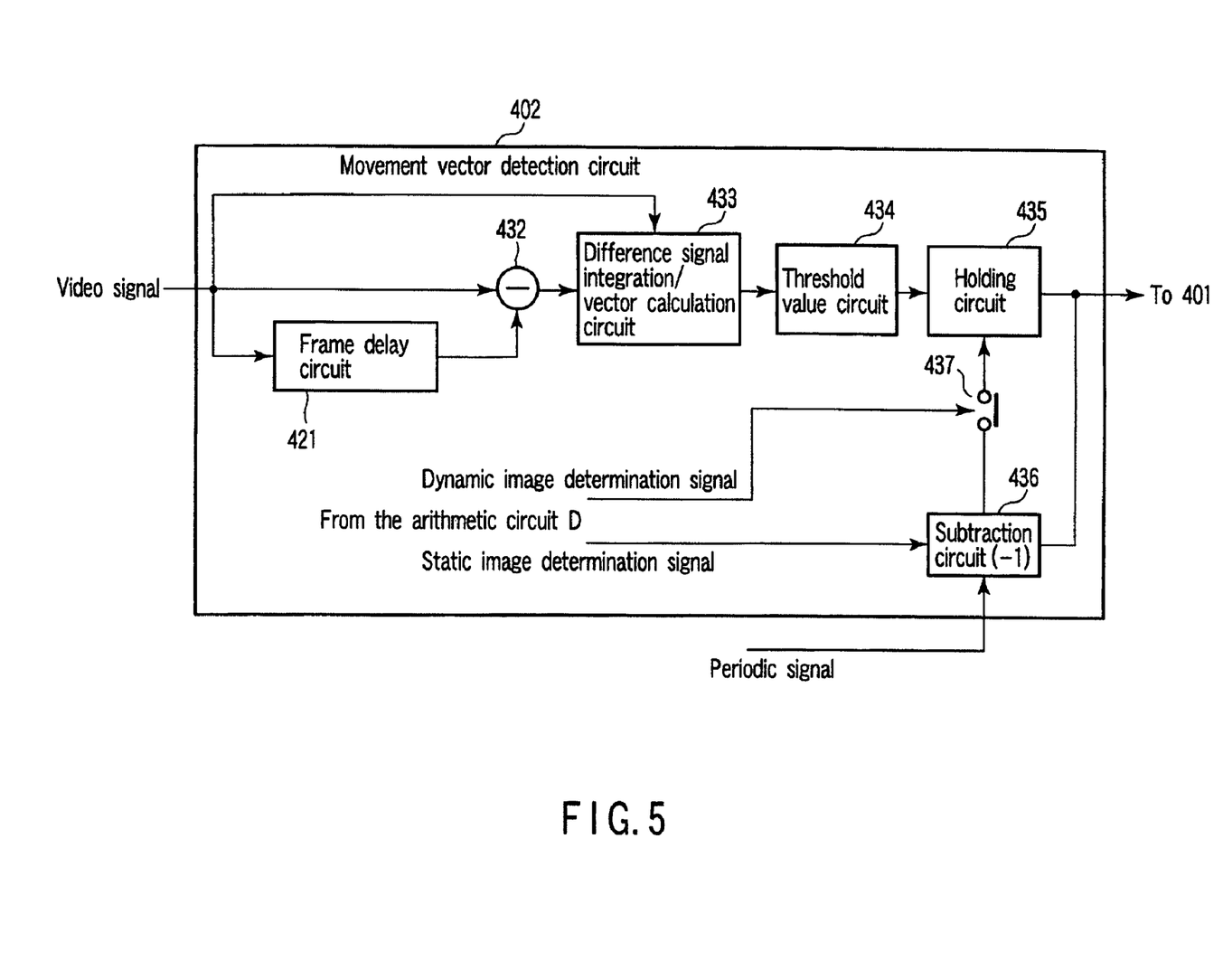
FIG. 5 shows an example of a movement vector detection circuit in a dynamic image improvement and frame rate conversion unit.

FIG. 5 shows an example of the movement vector detection circuit 402. An image is assumed to move in the following explanation. A video signal is input to a frame delay circuit 431 and a subtracter 432. The subtracter 432 provides a difference signal between the previous and next frames. When the input video signal indicates a still mage, the previous and next frames have the same value, and a difference signal is not generated. However, when dithering has been made as explained above, a difference signal is generated. The difference signal from the subtracter 432 is input to a difference signal integration/vector calculation circuit 433. The difference signal integration/vector calculation circuit provides a difference signal between the image processing unit blocks. Therefore, when a difference signal between frames is large with respect to a certain unit block, this indicates that an image is moved in this unit block and the area around this unit block. In the area determined to have image movement, a pixel value of a unit block in the previous frame and a similar pixel value of a unit block in the next frame are searched for. As a result, an image movement vector is detected. The movement vector is input to a threshold value circuit 434, and a movement vector exceeding a certain threshold value is output as a movement vector indicating a dynamic image. The movement vector value is held in a holding circuit 435, and supplied to a frame rate conversion circuit 401.

The output of the arithmetic circuit D is assumed to determine a dynamic image. A switch 437 is turned off by a dynamic image determination signal, and the output of a subtraction circuit 437 has no influence upon the holding circuit. Namely, the output of the movement vector detection circuit 402 is released.

When a static image determination signal is input from the arithmetic circuit D, the output of the holding circuit 435 is subtracted by −1 by the subtraction circuit 436, and fed back to the holding circuit 435 through a switch 427. Namely, the output of the holding circuit 435 is periodically subtracted, indicating a static image determination signal as a result. In the above operation, when the output of the arithmetic circuit D indicates a dynamic image, the switch 437 is turned off, and the holding circuit 435 holds the output of the threshold value circuit 434.

<Characteristic Functions>

According to the apparatus and method of the invention, as described above, even if a mismatch occurs in the results of determination of a dynamic image and a static image in the scanning line number conversion unit as a front stage and the dynamic image improvement and frame rate conversion unit as a rear stage, the dynamic image adaptive processing or static image adaptive processing of the dynamic image improvement and frame rate conversion unit follows the determination results in the scanning line number conversion unit, and a failure is unlikely to occur in a video signal output from the dynamic image improvement and frame rate conversion unit.

Another Embodiment of the Invention

Figure 6:
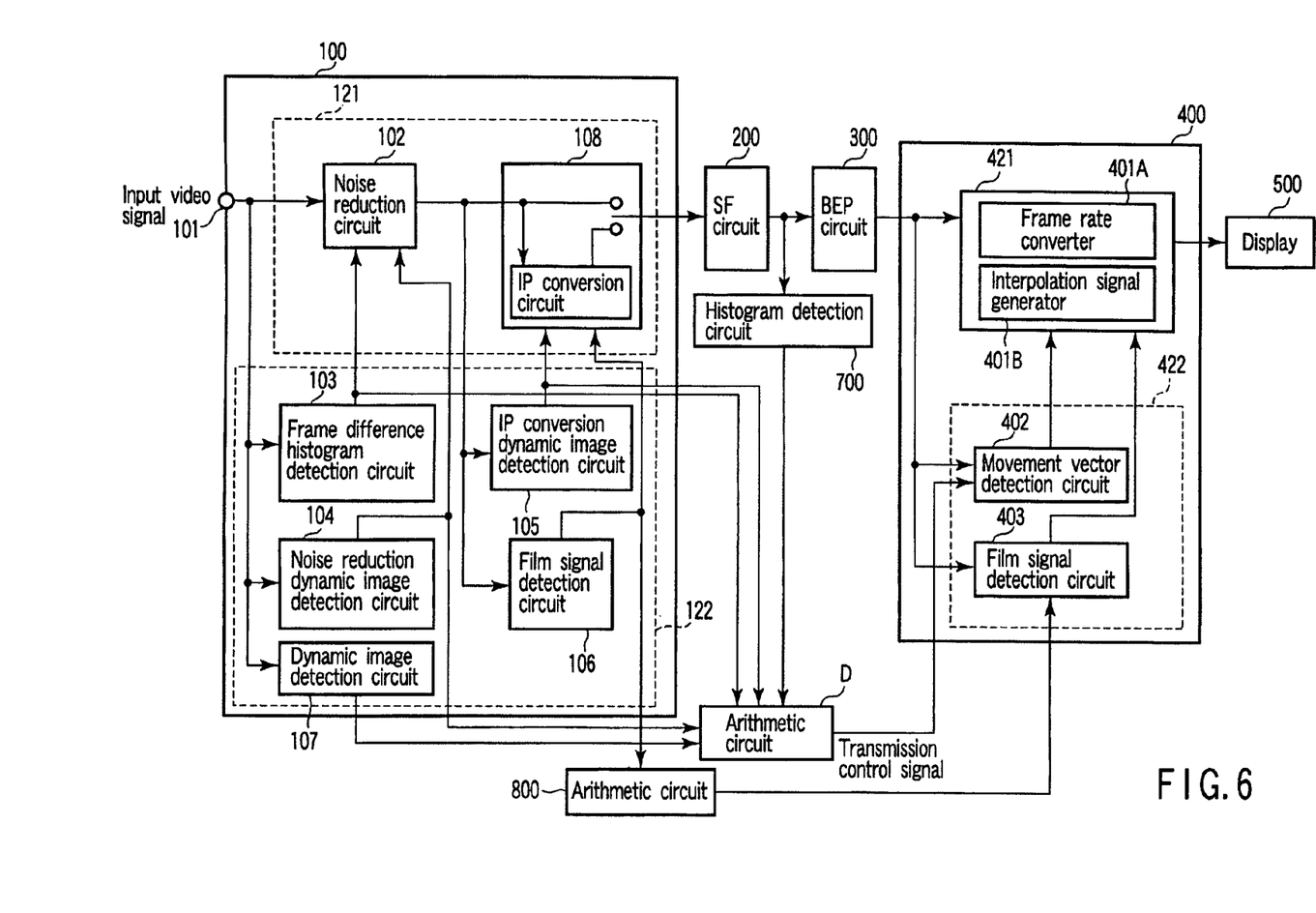
FIG. 6 is a block diagram of another embodiment of the invention.

The invention is not limited to the embodiment described hereinbefore. FIG. 6 shows another embodiment of the invention. Namely, an arithmetic unit 800 is added. The arithmetic circuit 800 receives a film signal detection signal from the film signal detection circuit 106. As explained hereinbefore, the film signal detection signal indicates a predetermined pattern when the input video signal is a film signal.

When the film signal detection signal from the film signal detection circuit 106 indicates a film signal, the arithmetic circuit 800 facilitates determination of a film signal by the film signal detection circuit 403 in the dynamic image improvement and frame rate conversion unit 400. Concretely, the arithmetic circuit sets the number of detections of a predetermined pattern to less than usual. Usually, when a predetermined pattern is continuously detected ten times, a film signal is determined. The number of determinations necessary to determine a film signal is decreased to 2 to 3 times. Therefore, even if a mismatch period occurs in the determination results in the scanning line number conversion unit as a front stage and the dynamic image improvement and frame rate conversion unit as a rear stage, the film signal adaptive processing of the dynamic image improvement and frame rate conversion unit follows the determination results of the scanning line number conversion unit, and a failure is unlikely to occur in a video signal output from the dynamic image improvement and frame rate conversion unit.

In contrast, when the film signal detection signal from the film signal detection circuit 106 indicates an ordinary video signal, not a film signal, the arithmetic unit 800 immediately switches the output of the film signal detection circuit 403 to a video detection state.

Even if the film signal detection circuit 403 detects a predetermined pattern and would otherwise malfunction, though an ordinary video signal is input, the malfunction is unlikely as the hysteresis characteristic is held. Namely, the film signal detection circuit 403 does not immediately output a film signal detection signal.

When the outputs of the movement vector detection circuit 402 and film signal detection circuit 403 are applied to the dynamic image improvement and frame rate conversion unit 400, AND of the signals is used as a control signal. It is also permitted to use OR of the signals as a control signal. Or, one of the signals may be selected according to the user's selection, or depending on the unit to be externally connected.

Further Embodiment of the Invention

Figure 7:
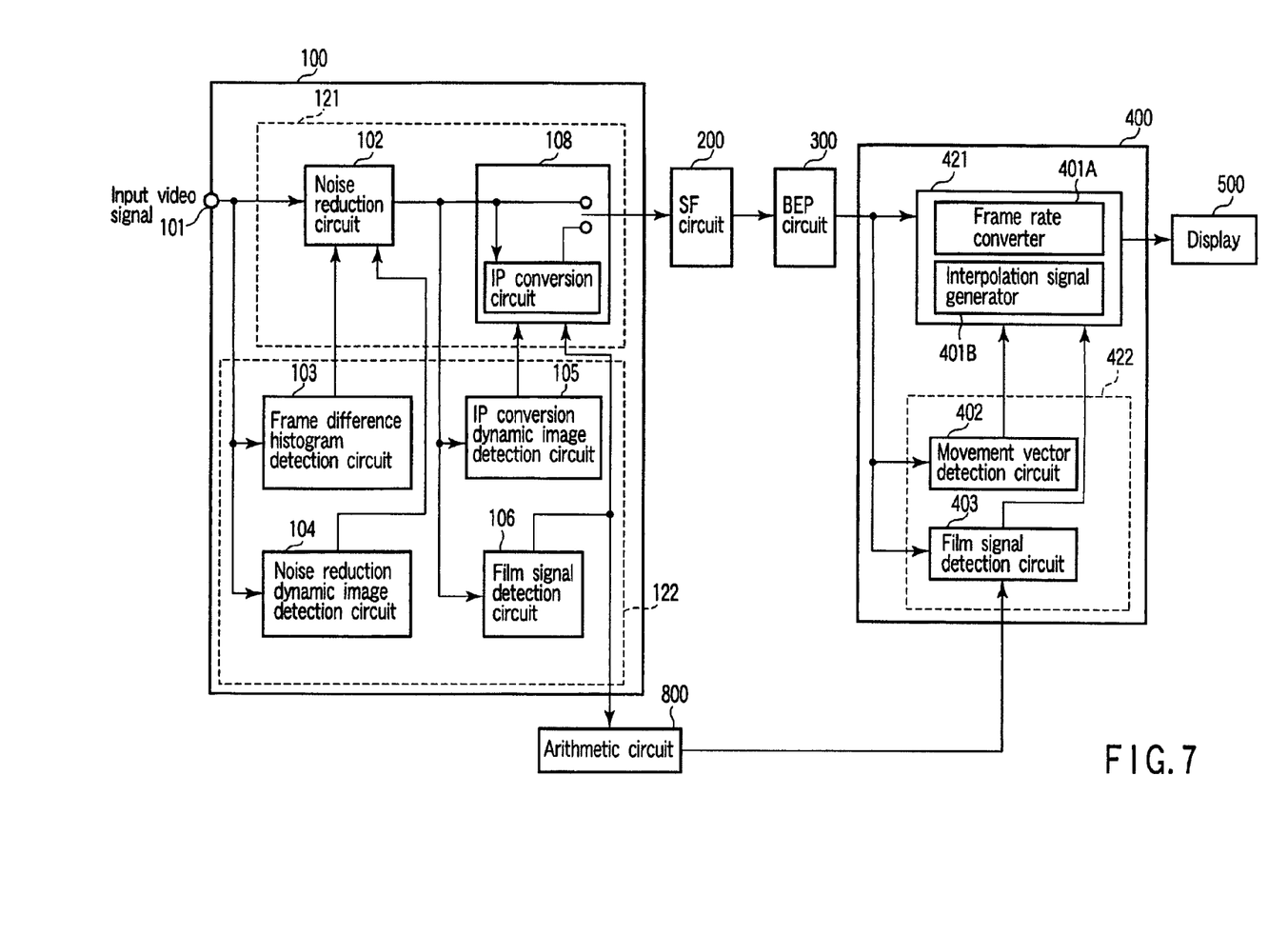
FIG. 7 is a block diagram of a further embodiment of the invention.

The invention is not limited to the embodiment described above. As shown in FIG. 7, the arithmetic circuit 800 may be configured to transmit a film detection signal to the film signal detection circuit 403 as a rear stage. The operation in this configuration is as explained hereinbefore.

<Example of Basic Configuration of the Scanning Line Number Conversion Circuit 108>

Figure 8:
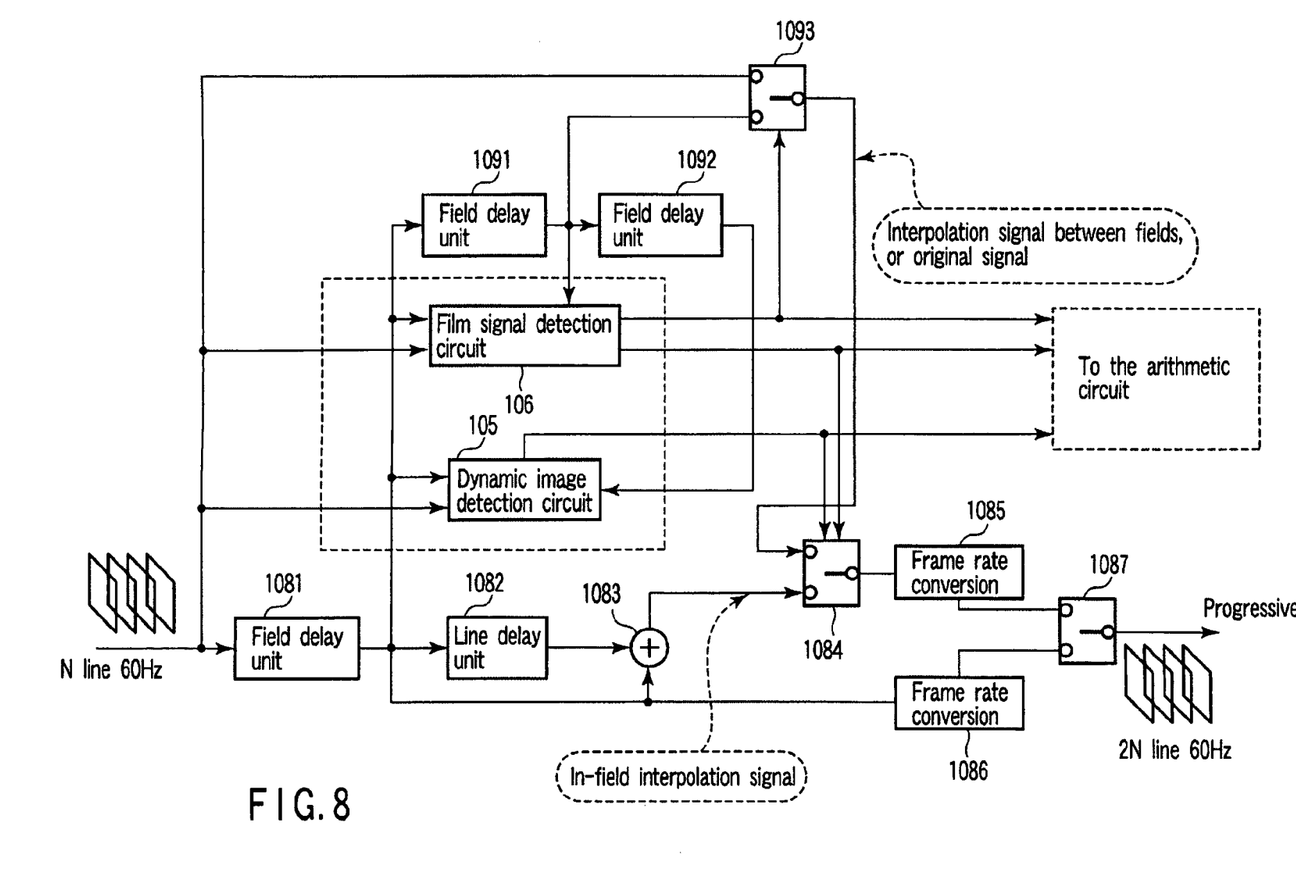
FIG. 8 is a diagram showing an example of a scanning line number conversion circuit.

FIG. 8 shows an example of a basic configuration of the scanning line number conversion circuit 108. An input video signal is input to a field delay unit 1081. The output of the field delay unit 1081 is input to a line delay unit 1082 and an adder 1083. The adder 1083 adds the outputs of the line delay unit 1082 and field delay unit 1081, and outputs an in-field interpolation signal to a selector 1084. The signal selected by the selector 1084 is input to a frame rate conversion circuit 1085 for doubling the line speed, and is converted to a double-speed signal for example. A frame rate conversion circuit 1086 converts the line from the field delay unit 1081 at double speed, and supplies the signal to a selector 1087. The selector 1087 alternately selects the outputs of the frame rate conversion circuits 1085 and 1086, and outputs the selected signal as a progressive signal.

When the selector 1084 selects the output of the adder 1083, a dynamic image adaptive processing state is adopted. When the selector 1084 selects the output of the selector 1093, a static image adaptive processing state is adopted.

The output of the field delay unit 1081 is also supplied to a field delay unit 1091. The output of the field delay unit 1091 is supplied to a field delay unit 1092 and a selector 1093. The selector 1093 selects the output of the field delay unit 1091, when the film signal detection circuit 106 detects that an input video signal is not a film signal. A signal applied to the frame rate conversion circuit 1085 at this time is a line signal in a previous field, and a signal applied to the frame rate conversion circuit 1086 is a line signal in the next field. Therefore, the above state is a static image adaptive processing state, in which a progressive signal is generated by using the line signals in the previous and next fields.

<When an Input is Detected as a Film Signal>

When the film signal detection circuit 106 detects a film signal, the following operation is performed. For example, when a 2-3pull-down signal is input, a selector 1093 basically selects a signal of the input side of a field delay unit 1081. The output of the selector 1093 is input to a frame rate conversion circuit 1085 through the selector 1084. In the film signal period, the selector 1084 selects the output of the selector 1093. Therefore, the signals of the input side and output side of the field delay unit 1081 are converted at double speed by the frame rate conversion circuits 1085 and 1086, and the converted signals are multiplexed by the selector 1087. The selector 1093 may select the output of the field delay unit 1091 according to the film signal pattern.

<When an Input is Detected as a Video Image, Not a Film Signal>

In the static image adaptive processing, the selector 1093 selects the output of the field delay unit 1091, and the selector 1084 selects the output of the selector 1093. Therefore, the signals of the output sides of the field delay units 1081 and 1091 are converted at double speed, and are multiplexed, providing a progressive signal.

In the dynamic image adaptive processing sate, the selector 1084 selects the output of the adder 1083. Therefore, the outputs of the field delay unit 1081 and adder 1083 are converted at double speed, and are multiplexed, providing a progressive signal.

Example of Basic Configuration of the Second Video Signal Processing Circuit 421

Figure 9:
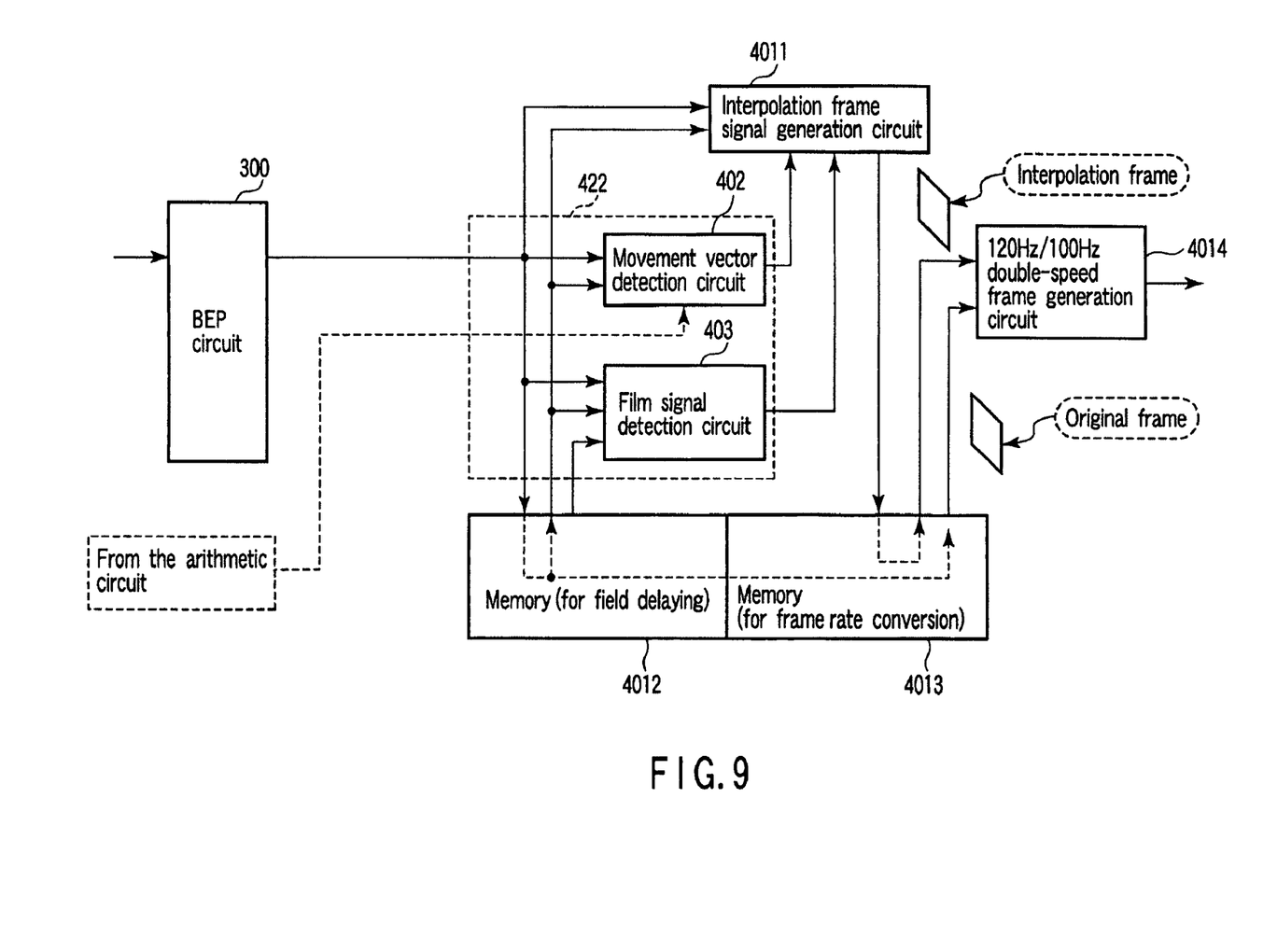
FIG. 9 is a diagram showing an example of a frame rate conversion circuit.

FIG. 9 shows details of the inside of the second video signal processing circuit 421. A frame rate converter 401A and interpolation signal generator 401B are formed as one piece. The second video signal processing circuit 421 is divided into four blocks: an interpolation signal generation circuit 4011, a field delay memory 4012, a frame rate conversion memory 4013, and a frame rate conversion unit 4014.

The interpolation signal generation circuit 4011 performs the dynamic image adaptive processing or static image adaptive processing, according to an image processing control signal generated by using a movement vector, generates an interpolation frame signal, and supplies the interpolation frame signal to the memory 4013. The memory 4013 also stores the output of the BEP circuit 300. The output of the memory 4013 is read at double speed, and applied to the frame rate conversion circuit 4014. The frame rate conversion circuit 4014 outputs a video signal obtained by converting a frame frequency to 120 Hz (conformable to NTSC) or 100 Hz (conformable to PAL, SECAM) at double speed by using an interpolation frame signal and original frame signal.

Figure 10:
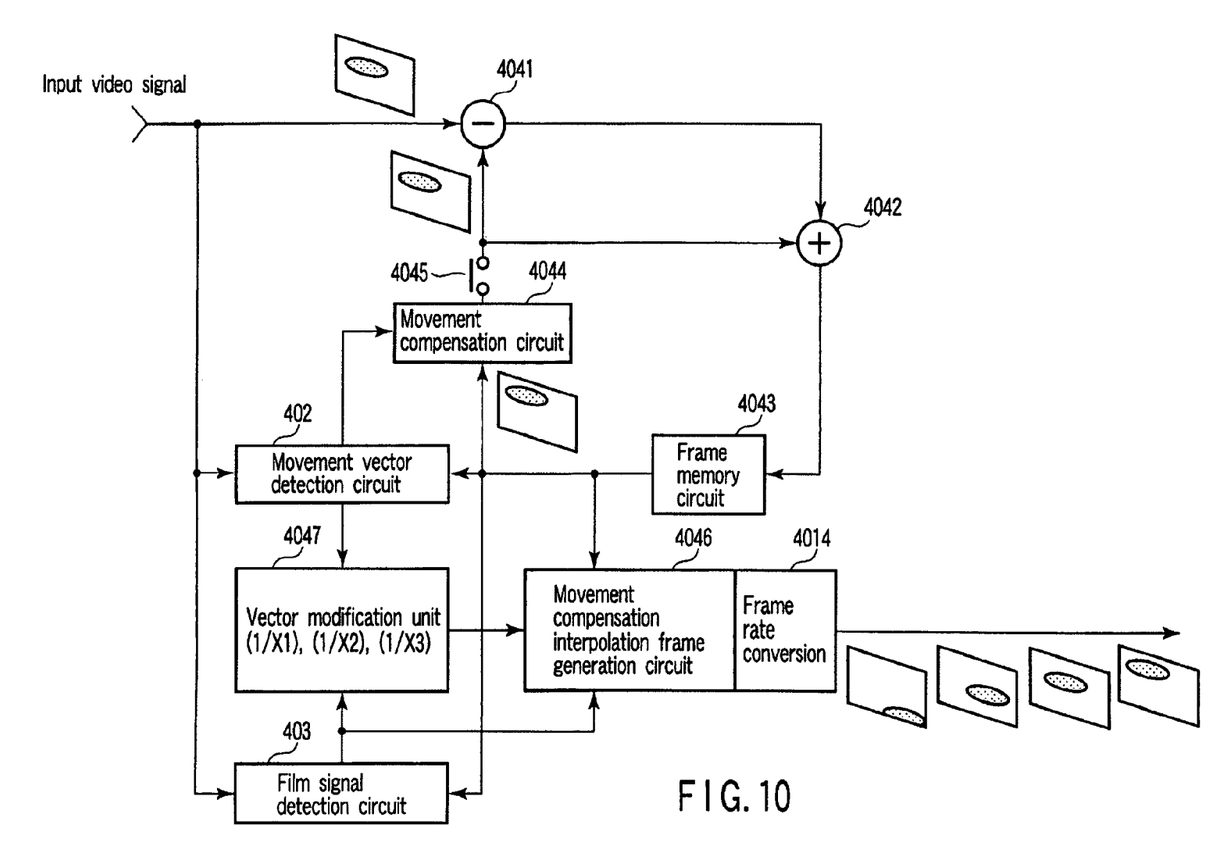
FIG. 10 is a diagram showing an example of an interpolation frame generation circuit.

FIG. 10 shows an example of a processing circuit for obtaining an interpolation frame signal. The processing circuit shows details of the interpolation frame generation circuit 4011, memory 4012 and frame rate conversion memory 4013.

An input video signal is input to a subtracter 4041. The subtracter 4041 subtracts a movement compensated video signal created by a movement compensation circuit 4044, from the input video signal. A movement compensated video signal is a video signal from a frame memory circuit 4043, whose movement is corrected based on the movement vector from the movement vector detection circuit 402. When a movement compensated video signal is not different from an input video signal, there is no image movement, and the subtracter 4041 outputs zero. When a movement compensated video signal is different from an input video signal, there is image movement, and the subtracter 4041 outputs a difference signal. The difference signal indicates the image movement component, and is added to the output of the movement compensation circuit 4044 by the adder 4042, and stored in the frame memory circuit 4043. As a result, the frame memory circuit 4043 stores a video signal with the movement modified according to the image movement vector.

The output video signal of the frame memory circuit 4043 is compared with the next input video signal in the movement vector detection circuit 402, and an image movement vector is detected. As explained above, the output video signal of the frame memory circuit 4043 is corrected according to the image movement vector in the movement compensation circuit 4044.

A switch 4045 is turned off, when an input video signal differs from a video signal in a previous frame as a result of a scene change. At this time, the input video signal is stored in the frame memory circuit 4043 without being modified, and used for comparison with the next frame.

The output of the frame memory circuit 4043 is also input to a movement compensation interpolation frame generation circuit 4046. The movement compensation interpolation frame generation circuit 4046 corrects movement of the image read from the frame memory 4043 according to the movement vector from the vector modification unit 4047, creates a movement corrected image, and saves the movement corrected image. The vector modification unit 4047 modifies the movement vector from the movement vector detection circuit 402. When an ordinary video signal is processed (when a video signal, not a film signal, is processed), the vector modification unit sets the vector from the movement vector detection circuit 402 to (1/2), for example. By using this movement vector, the vector modification unit modifies the image read from the frame memory circuit 4043, and creates an image for an interpolation frame. Namely, for converting a frame at double speed, an interpolation frame is created between the previous and next frames, in the time direction of the input video signal. Therefore, the (1/2) vector of the image movement vector detected from the previous and next frames is suitable for creating an interpolation frame.

The vector modification unit 4047 can prepare two or more kinds of vector by using the movement vector A from the movement vector detection circuit 402. For example, movement vectors (1/2)A, (1/5)A, (2/5)A, (3/5)A, (4/5)A, (5/5)A, (1/3)A, (2/3)A, and (3/3)A. By using these movement vectors, the movement compensation interpolation frame generation circuit 4046 can compensate the movement of the output video signal in the frame memory circuit 4043, and once buffer the compensated video signal.

The buffered interpolation frame signal is controlled in the output timing from the movement compensation interpolation frame generation circuit 4046, by the control signal from the film signal detection circuit 403. Namely, a film judder is canceled, and an image is modified to move a moving image smoothly when a frame is changed. For example, a 2-3pulldown film signal has a frame change pattern of 000110001100011 . . . . Therefore, when a frame change pattern is changed from 0 to 1, and vice versa, sudden unnatural movement occurs in a dynamic image. To reduce such unnatural movement, a moving image is modified to smoothly move with the change of a frame. As described above, when a film signal is detected, image movement is compensated according to the detection pattern. When the film signal detection circuit 403 detects a film signal, the switch 4045 preferentially responds to the control signal from the film signal detection circuit 403. When a dynamic image is detected, the switch 4045 is turned on. When a signal indicating detection of a film signal is received from the arithmetic circuit 800 in the front stage, the film detection circuit 403 automatically executes processing according to the film signal in the rear stage.

While certain embodiments of the invention have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fail within the scope and spirit of the invention.

What is claimed is:

1. A video signal processing apparatus comprising:
   a front stage unit configured to process a first video signal; and
   a rear stage unit configured process a progressive signal output from the front stage unit,
   wherein the front stage unit has a first control circuit which determines the image characteristic of the first video signal, and outputs a first image processing control signal determining which of dynamic image adaptive processing and static image adaptive processing is to be performed for the first video signal; and a first video signal processing circuit which provides a progressive signal that is formed by performing the dynamic image adaptive processing or static image adaptive processing for the first video signal in response to the first image processing control signal,
   the rear stage unit has a second control circuit which determines the image characteristic of the progressive signal as information to generate an interpolation frame signal for doubling the frame frequency of the progressive signal from the first video signal processing circuit, and outputs a second image processing control signal determining which of dynamic image adaptive processing and static image adaptive processing is to be performed for the progressive signal; and a second video signal processing circuit which provides the interpolation frame signal that is formed by performing the dynamic image adaptive processing or static image adaptive processing for the progressive signal in response to the second image processing control signal, and provides a frame rate conversion output signal by using the interpolation frame signal and progressive signal, and
   an arithmetic circuit is connected between the front stage unit and rear stage unit, the arithmetic circuit providing a transmission control signal, which controls the second image processing control signal not to shift to an output state of dynamic image adaptive processing, and corrects to shift to an output state of static image adaptive processing, when the first image processing control signal indicates static image adaptive processing, and releases the control when the first image processing control signal indicates dynamic image adaptive processing, the transmission control signal being applied to the second control circuit.

2. The video signal processing apparatus of claim 1, wherein the progressive signal input from the front stage unit to the rear stage unit is input through a scale filter unit for scaling the output signal from the front stage unit, and an image quality adjustment unit for adjusting image quality of the output video signal from the scale filter unit.

3. The video signal processing apparatus of claim 2, wherein the first video signal processing circuit includes a noise reduction circuit to reduce noise in the first video signal,
   the first control circuit includes a noise reduction dynamic image detection circuit, and a frame difference histogram detection circuit, and
   controls the filtering effect of the noise reduction circuit by a movement detection signal of the noise reduction dynamic image detection circuit and a histogram signal of the frame difference histogram detection circuit.

4. The video signal processing apparatus of claim 3, wherein the first video signal processing circuit includes a scanning line number conversion circuit which converts the number of scanning lines of the output video signal of the noise reduction circuit, and
   the first control circuit further includes an interlace-progressive (IP) conversion dynamic image detection circuit, and a film signal detection circuit, and controls selection of a line signal by the scanning line number conversion circuit.

5. The video signal processing apparatus of claim 4, wherein the first control circuit has a dynamic image detection circuit, and mixes a movement detection signal from the dynamic image detection circuit into at least the first image processing signal.

6. The video signal processing apparatus of claim 4, wherein
   the first control circuit has a dynamic image detection circuit, and
   the video signal processing apparatus further comprising a histogram detection circuit to detect a histogram of the output of the scale filter unit,
   wherein the arithmetic circuit provides the transmission control signal by using one or more of a movement detection signal from the IP conversion dynamic image detection circuit, a movement detection signal from the noise reduction dynamic image detection circuit, a histogram signal from the frame difference histogram detection circuit, a histogram signal from the histogram detection circuit, and a movement detection signal from the dynamic image detection circuit.

7. The video signal processing apparatus of claim 1, wherein the second control circuit has a movement vector detection circuit which detects an image movement vector of the progressive signal from the first video signal processing circuit, and a film signal detection circuit which determines whether the progressive signal is a film signal.

8. A video signal processing method of an image signal processing apparatus, the image signal processing apparatus having a front stage unit for processing a first video signal, and a rear stage unit for processing a progressive signal output from the front stage unit, wherein the front stage unit has a first control circuit which determines the image characteristic of the first video signal, and outputs a first image processing control signal determining which of dynamic image adaptive processing and static image adaptive processing is to be performed for the first video signal; and a first video signal processing circuit which provides a progressive signal that is formed by performing the dynamic image adaptive processing or static image adaptive processing for the first video signal in response to the first image processing control signal, the rear stage unit has a second control circuit which determines the image characteristic of the progressive signal as information to generate an interpolation frame signal for doubling the frame frequency of the progressive signal from the first video signal processing circuit, and outputs a second image processing control signal determining which of dynamic image adaptive processing and static image adaptive processing is to be performed for the progressive signal; and a second video signal processing circuit which provides the interpolation frame signal that is formed by performing the dynamic image adaptive processing or static image adaptive processing for the progressive signal in response to the second image processing control signal, and provides a frame rate conversion output signal by using the interpolation frame signal and progressive signal, and an arithmetic circuit is connected between the front stage unit and rear stage unit;

the video signal processing method comprising:

generating a transmission control signal by the arithmetic circuit, a transmission control signal being applied to the second control circuit; and controlling, by said transmission control signal, the second image processing control signal not to shift to an output state of dynamic image adaptive processing, and correcting to shift to an output state of static image adaptive processing, when the first image processing control signal indicates static image adaptive processing, and releasing the control when the first image processing control signal indicates dynamic image adaptive processing.

* * * * *